| (12) | United States Patent | (10) Patent No.: | US 8,120,724 B2 |
|---|---|---|---|
| | Ho et al. | (45) Date of Patent: | Feb. 21, 2012 |

(54) LIQUID CRYSTAL DISPLAY DEVICE HAVING FRAMES WITH A PLURALITY OF FASTENERS HAVING OPENINGS AND BAFFLES

(75) Inventors: Chung-Hsing Ho, Kaohsiung County (TW); Yao-Tung Wang, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 432 days.

(21) Appl. No.: 12/503,825

(22) Filed: Jul. 15, 2009

(65) Prior Publication Data

US 2009/0279016 A1 Nov. 12, 2009

Related U.S. Application Data

(62) Division of application No. 11/163,810, filed on Oct. 31, 2005, now Pat. No. 7,580,089.

(51) Int. Cl.
  *G02F 1/1333* (2006.01)
  *G02F 1/1335* (2006.01)
(52) U.S. Cl. ............... 349/58; 349/62; 349/65; 349/70; 362/29; 385/146

(58) Field of Classification Search .................... 349/58, 349/62, 65–71; 361/681, 752; 362/29; 385/146
See application file for complete search history.

(56) References Cited

U.S. PATENT DOCUMENTS

| 2008/0316389 A1* | 12/2008 | Zensai | 349/58 |
| 2009/0091684 A1* | 4/2009 | Tanaka et al. | 349/62 |
| 2009/0091688 A1* | 4/2009 | Tanaka et al. | 349/65 |
| 2009/0161345 A1* | 6/2009 | Hsu et al. | 362/97.2 |

* cited by examiner

*Primary Examiner* — Huyen Ngo
(74) *Attorney, Agent, or Firm* — Jianq Chyun IP Office (57) ABSTRACT

A liquid crystal display device including a backlight module, a liquid crystal display device panel and a second frame is provided. The backlight module has a first frame. The first frame has a first body, first fasteners and baffles, wherein the first fasteners and the baffles are integrally formed on the first body, and the first fasteners have opening. The liquid crystal display device panel is arranged on the backlight module. The second frame is assembled with the first frame for fixing the liquid crystal display device panel. The second frame has a second body and second fasteners integrally formed on the second body, and the second fasteners lodge in the openings of the first fasteners to limit the relative displacement between the first and second body, and the baffles are adapted for limiting the relative displacement between the first body and second body.

5 Claims, 12 Drawing Sheets

LIQUID CRYSTAL DISPLAY DEVICE HAVING FRAMES WITH A PLURALITY OF FASTENERS HAVING OPENINGS AND BAFFLES

CROSS-REFERENCE TO RELATED APPLICATION

This is a divisional application of and claims the priority benefit of patent application Ser. No. 11/163,810, filed on Oct. 31, 2005. The entirety of the above-mentioned patent application is hereby incorporated by reference herein and made a part of this specification.

BACKGROUND OF THE INVENTION

1. Field of the Invention

The present invention generally relates to a display device. More particularly, the present invention relates to a liquid crystal display device.

2. Description of Related Art

Recently, the thin film transistor liquid crystal display device (TFT-LCD) having the advantages of high picture quality, slim, low power consumption and radiation-free has gradually become the mainstream in the display market. The TFT-LCD is composed of a liquid crystal display device panel and a backlight module. The liquid crystal display device panel and the backlight module are assembled by frames.

Figure 1:
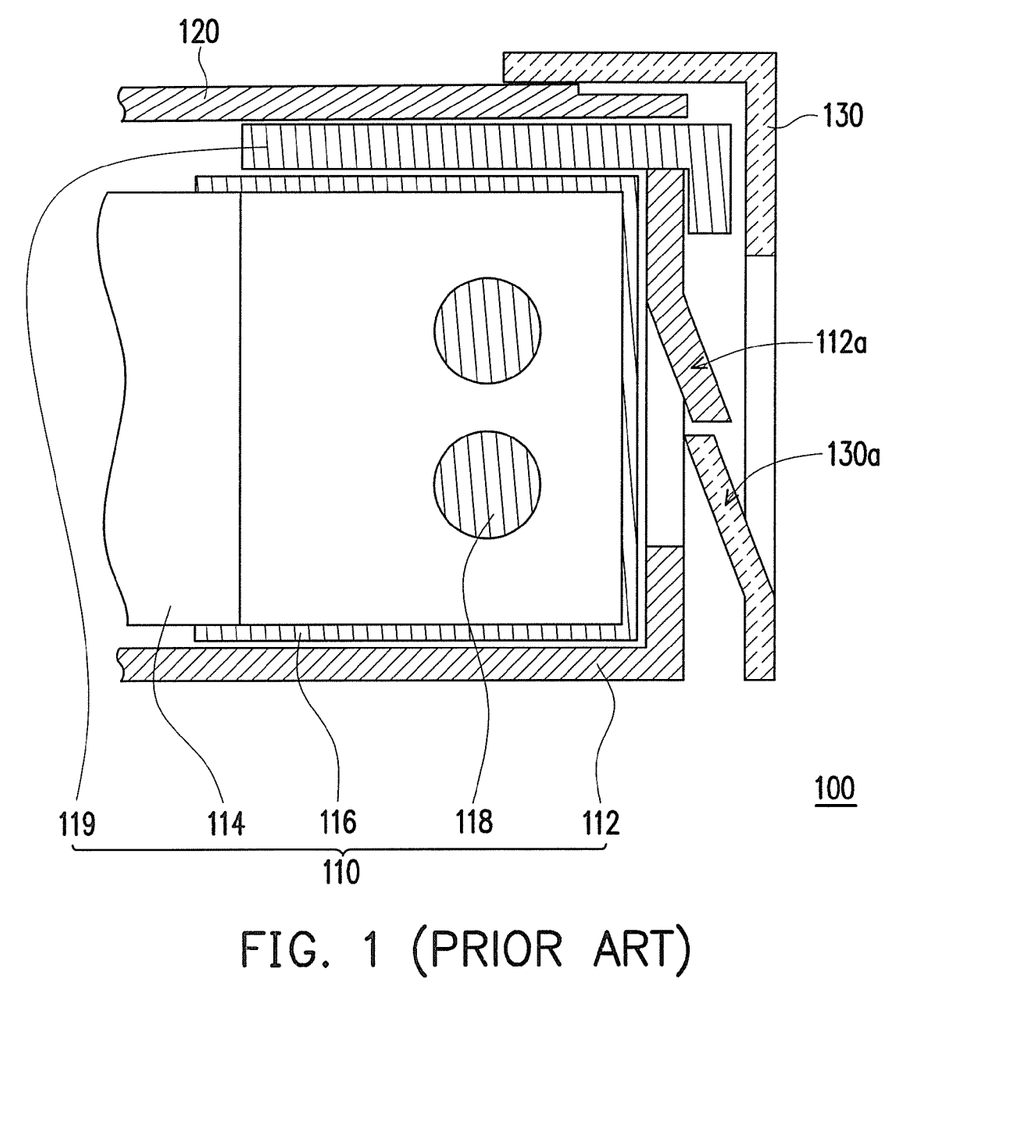
FIG. 1 is a schematic cross-sectional view showing a conventional liquid crystal display device.

FIG. 1 is a schematic cross-sectional view showing a conventional liquid crystal display device. The conventional liquid crystal display device 100 comprises a backlight module 110, a liquid crystal display device panel 120 and a second frame 130. The backlight module 110 comprises a first frame 112. The liquid crystal display device panel 120 is arranged on the backlight module 110. The first frame 112 is assembled with the second frame 140 for fixing the liquid crystal display device panel 120. Besides, the backlight module 110 further comprises a light guiding plate 114, a reflector 116, a light source 118 and a sealant 119. The light guiding plate 114 is arranged inside the first frame 112, and the reflector 116 is arranged beside the light guiding plate 114. The sealant 119 is arranged between the first frame 112 and the liquid crystal display device panel 120, and the light source 118 can be a cold cathode fluorescent lamp (CCFL) or a light emitting diode array. More specifically, light emitted from the light source 118 is reflected by the reflector 116 and incident to the liquid crystal display device panel 120 by the light guiding plate 114.

The first frame 112 and the second frame 130 comprise a fastener 112a and a fastener 130a respectively. As shown in FIG. 1, the fastener 112a of the first frame 112 lodges in the fastener 130a of the second frame 130 in order to assemble the liquid crystal display device panel 120 with the backlight module 110. In brief, the conventional liquid crystal display device panel 120 and the backlight module 110 are fixed after the fastener 112a lodges in the fastener 130a. The next figure only shows the first frame 112 and the second frame 130 in order to simplify the drawing.

Figure 2A:
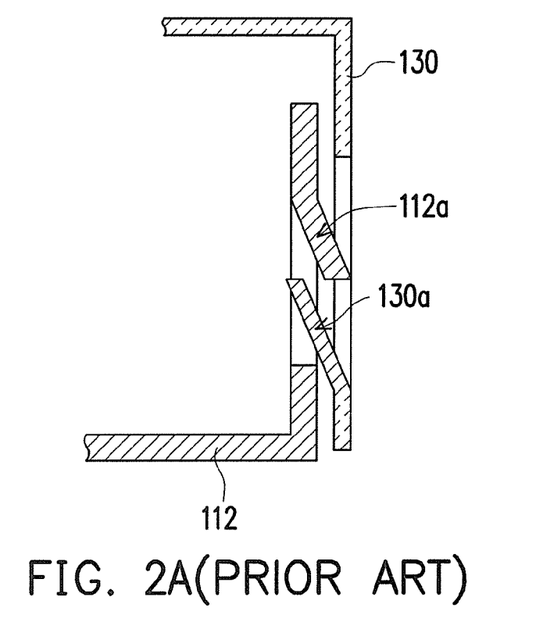
FIG. 2A is a schematic cross-sectional view showing the first frame lodges in the second frame when the liquid crystal display device panel is not impacted.
Figure 2B:
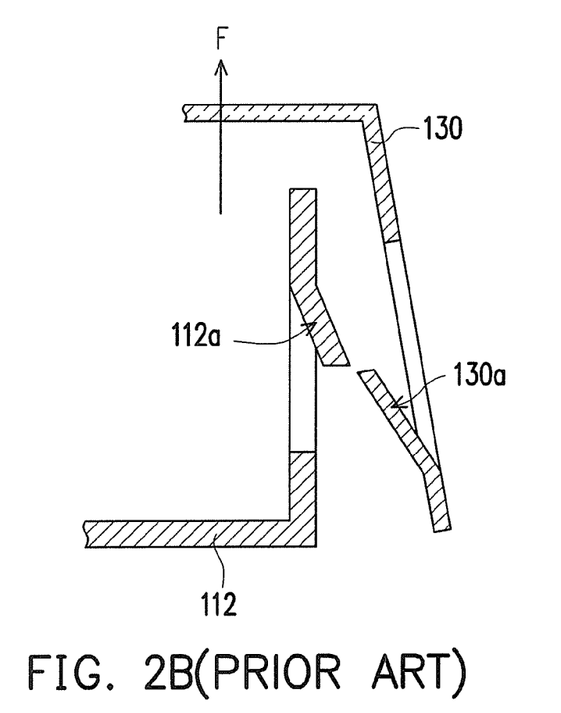
FIG. 2B is a schematic cross-sectional view showing the separated fasteners when the conventional liquid crystal display device panel is impacted.
Figure 2C:
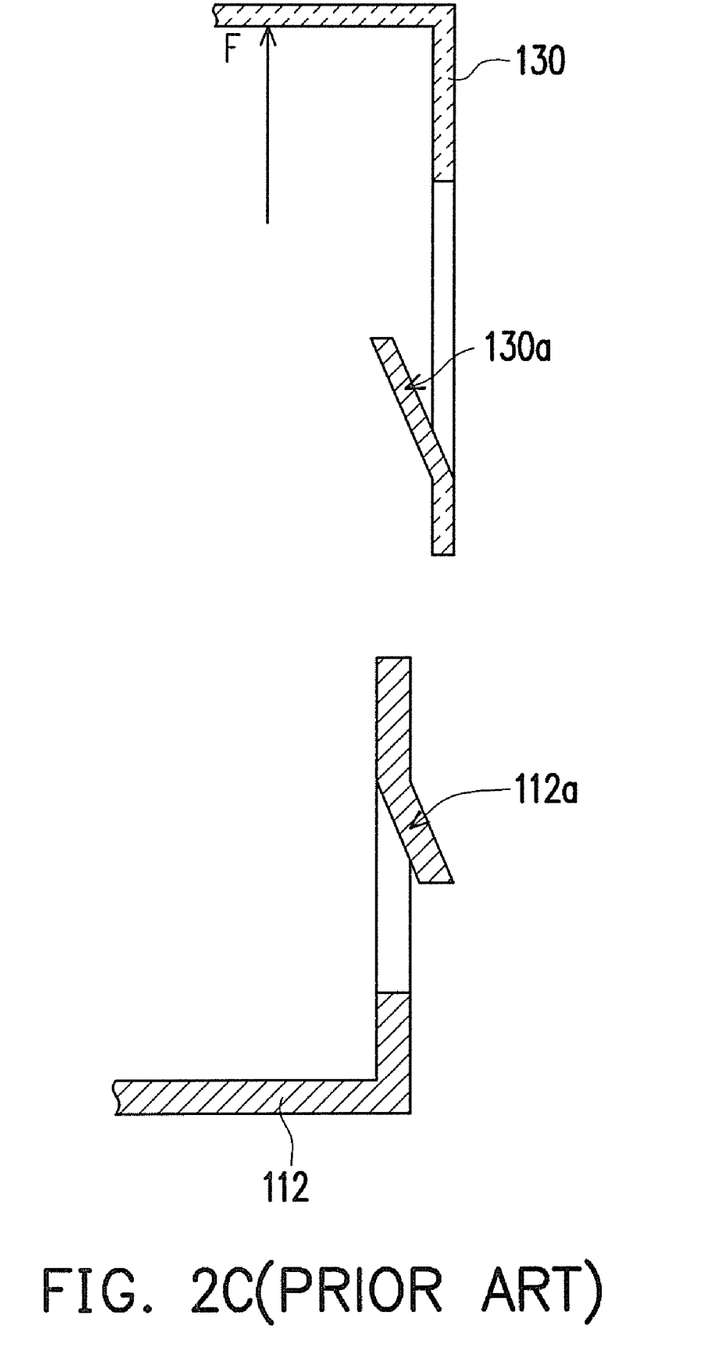
FIG. 2C is a schematic cross-sectional view showing the separated frame.

FIG. 2A is a schematic cross-sectional view showing the first frame lodges in the second frame when the liquid crystal display device panel is not impacted. FIG. 2B and FIG. 2C are schematic cross-sectional views showing the separated fasteners and frames when the conventional liquid crystal display device panel is impacted. First, please refer to FIG. 2A, the fastener 112a of the first frame 112 lodges in the fastener 130a of the second frame 130. When the first frame 112 is impacted along some direction (as the impact force F shown in FIG. 2B), the impact force F is applied to the first frame 112, and then the fastener 112a of the first frame 112 would be dragged upward to make the fastener 112a separate from the fastener 130a of the second frame 130. So, as shown in FIG. 2C, the first frame 112 separates from the second frame 130.

In light of the above, the structure strength of the conventional liquid crystal display device 100 is determined by the lodge strength between the fastener 112a and 130a. Although the anti-impact ability of the conventional liquid crystal display device 100 can be improved by increasing the lodge area between the fastener 112a and 130a, the size of the fastener 112a and 130a are limited to the design of the liquid crystal display device with narrow frame.

SUMMARY OF THE INVENTION

Accordingly, the present invention is directed to a liquid crystal display device. When the liquid crystal display device is impacted, a first frame and a second frame of the liquid crystal display device can not be separated easily.

To achieve the above and other objects, the present invention provides a liquid crystal display device. The liquid crystal display device comprises a backlight module, a liquid crystal display device panel and a second frame. The backlight module comprises a first frame. The first frame comprises a first body, a plurality of first fasteners and a plurality of baffles, and the first fasteners and the baffles are arranged on a sidewall of the first body. The liquid crystal display device panel is arranged on the backlight module. The second frame is assembled with the first frame for fixing the liquid crystal display device panel, and the second frame comprises a second body and a plurality of second fasteners arranged on a sidewall of the second body. The second fasteners lodge in the corresponding first fasteners to limit the relative displacement between the first and second body along a first direction, and the baffles are adapted for limiting the relative displacement between the first and second body along a second direction.

According to an embodiment of the present invention, the first direction is perpendicular to the second direction.

According to an embodiment of the present invention, the first fasteners and the second fasteners pierce through the second body and the first body respectively.

According to an embodiment of the present invention, the baffles pierce through the second body respectively, and the baffles and the first body are disposed at one side and the other side of the second body.

According to an embodiment of the present invention, the backlight module further comprises a light guiding plate, a reflector, a light source and a sealant. The light guiding plate is arranged inside the first frame. The reflector is arranged beside the light guiding plate. The light source is arranged inside the reflector. The sealant is arranged between the first frame and the liquid crystal display device panel.

According to an embodiment of the present invention, the light source comprises a cold cathode fluorescent lamp or a light emitting diode array.

To achieve the above and other objects, the present invention provides a liquid crystal display device. The liquid crystal display device comprises a backlight module, a liquid crystal display device panel and a second frame. The backlight module comprises a first frame. The first frame comprises a first body and a plurality of first fasteners, and the first fasteners are arranged on a sidewall of the first body. The liquid crystal display device panel is arranged on the backlight module. The second frame is assembled with the first frame for fixing the liquid crystal display device panel. The second frame comprises a second body and a plurality of second fasteners arranged on a sidewall of the second body. The second fasteners have a plurality of opening, and the corresponding first fasteners lodge in the openings. The first fasteners fasten with the corresponding second fasteners, to limit the relative displacement between the first and second body along a first direction, and the baffles are adapted for limiting the relative displacement between the first and second body along a second direction.

According to an embodiment of the present invention, the first direction is perpendicular to the second direction.

According to an embodiment of the present invention, the first fasteners and the second fasteners pierce through the second body and the first body respectively.

According to an embodiment of the present invention, the backlight module further comprises a light guiding plate, a reflector, a light source and a sealant. The light guiding plate is arranged inside the first frame. The reflector is arranged beside the light guiding plate. The light source is arranged inside the reflector. The sealant is arranged between the first frame and the liquid crystal display device panel.

According to an embodiment of the present invention, the light source comprises a cold cathode fluorescent lamp or a light emitting diode array.

In summary, the liquid crystal display device of the present invention utilizes the baffles lodged in the fasteners to improve the lodge strength between frames and then the structure strength of the liquid crystal display device can be improved, too.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

First Embodiment

Figure 3A:
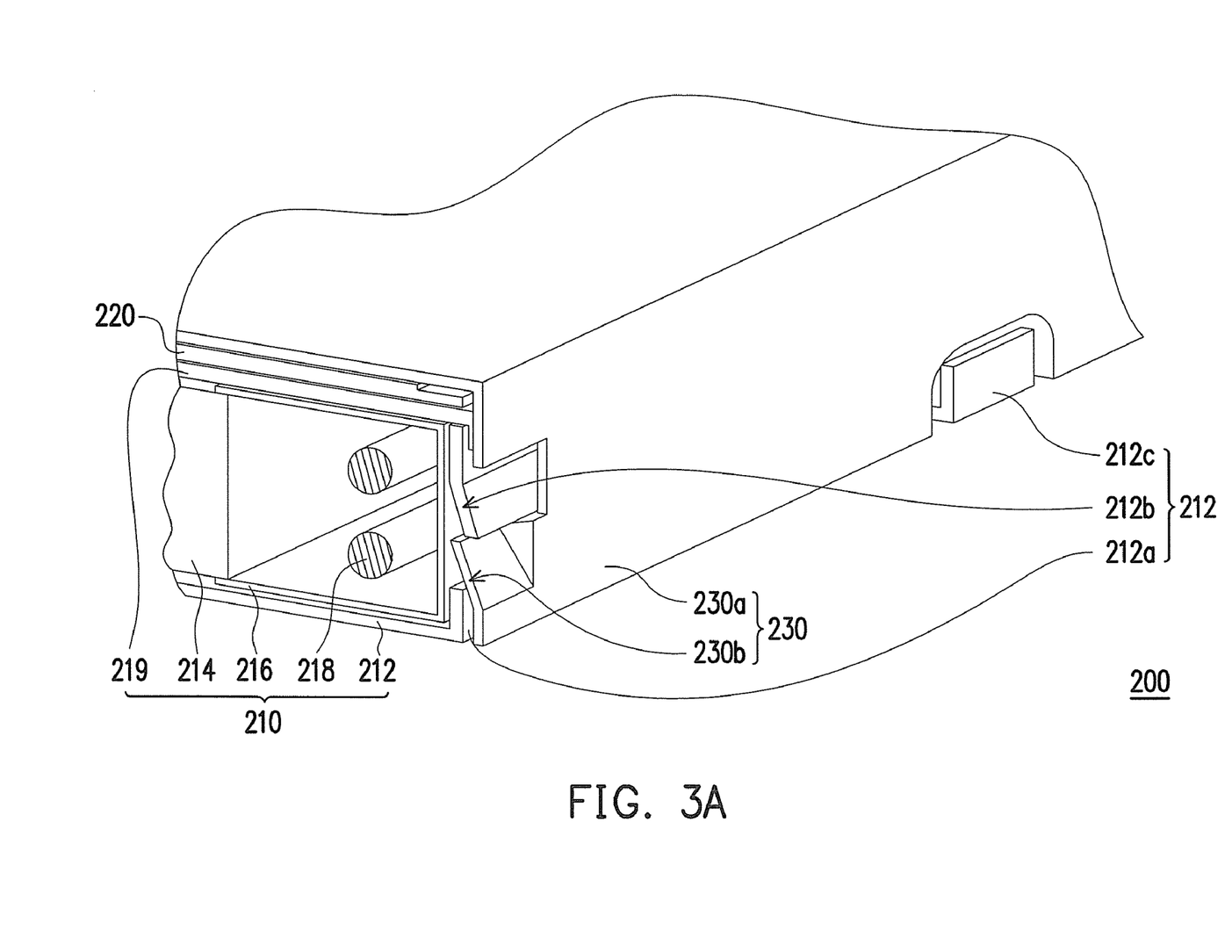
FIG. 3A is a three-dimensional diagram showing a liquid crystal display device according to a first embodiment of the present invention.
Figure 3B:
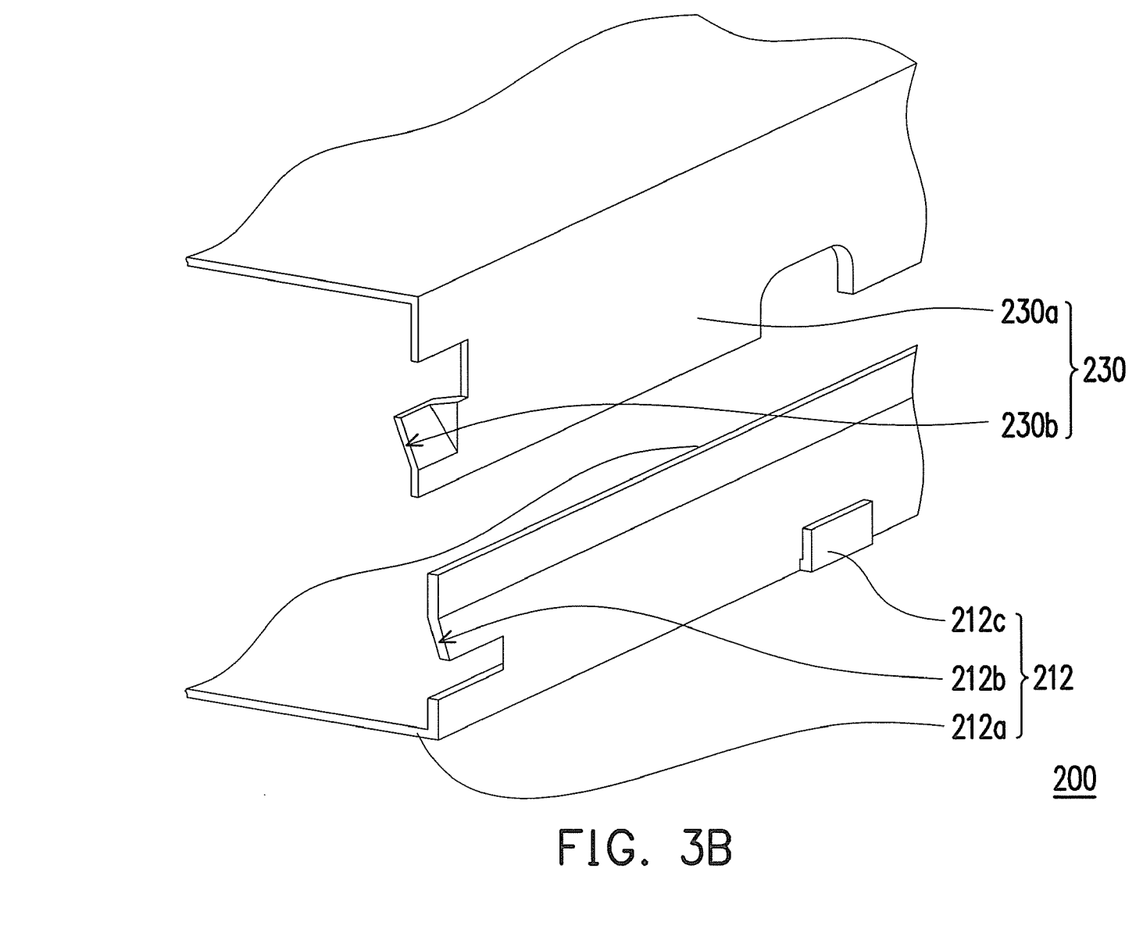
FIG. 3B is a partial three-dimensional diagram showing the first frame and the second frame of the liquid crystal display device.

FIG. 3A is a three-dimensional diagram showing a liquid crystal display device according to the first embodiment of the present invention. FIG. 3B is a partial three-dimensional diagram showing the first frame and the second frame of the liquid crystal display device. Please refer to FIGS. 3A and 3B, the liquid crystal display device 200 comprises a backlight module 210, a liquid crystal display device panel 220 and a second frame 230. The backlight module 210 comprises a first frame 212. The liquid crystal display device panel 220 is arranged on the backlight module 210. The first frame 212 is assembled with the second frame 230, to fix the liquid crystal display device panel 220. Besides, the backlight module 210 further comprises a light guiding plate 214, a reflector 216, a light source 218 and a sealant 219. The light guiding plate 214 is arranged inside the first frame 212. The reflector 216 is arranged beside the light guiding plate 214. The light source 218 is arranged inside the reflector 216. The sealant 219 is arranged between the first frame 212 and the liquid crystal display device panel 220. The light source 218 can be a cold cathode fluorescent lamp (CCFL) or a light emitting diode array. More specifically, the light emitted from the light source 218 is reflected by the reflector 216 and then the light is incident into the liquid crystal display device panel 220 through the light guiding plate 214. Please continue to refer to FIGS. 3A and 3B, the first frame 212 comprises a first body 212a, a plurality of first fasteners 212b and a plurality of baffles 212c, and the first body 212a, the first fasteners 212b and the baffles 212c are integrally formed as shown in FIG. 3B. These first fasteners 212b and baffles 212c are arranged on a sidewall of the first body 212a. The second frame 230 comprises a second body 230a and a plurality of second fasteners 230b arranged on a sidewall of the second body 230a, and the second body 230a and the second fasteners 230b are integrally formed as shown in FIG. 3B. Further, as shown in FIG. 3A, the second fastener 230b fastens with the corresponding first fastener 212b in order to limit the relative displacement between the first body 212a and the second body 230a along a first direction D1. The baffle 212c is adapted for limiting the relative displacement between the first body 212a and the second body 230a along a second direction D2. Besides, the first direction D1 is perpendicular to the second direction D2.

Figure 4A:
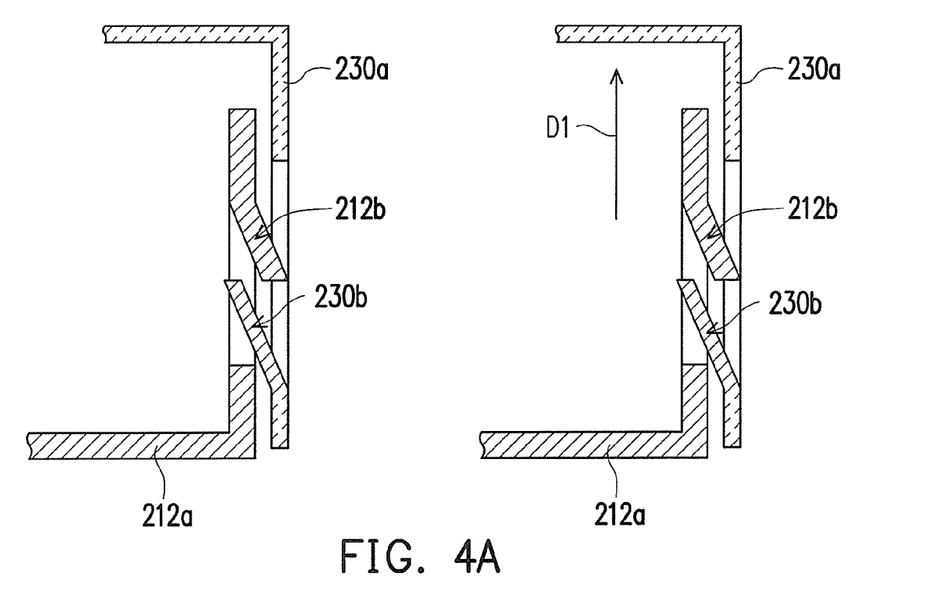
FIGS. 4A and 4B are schematic cross-sectional views respectively showing the first fastener and the baffle when the frame shown in FIG. 3A is impacted.
Figure 4B:
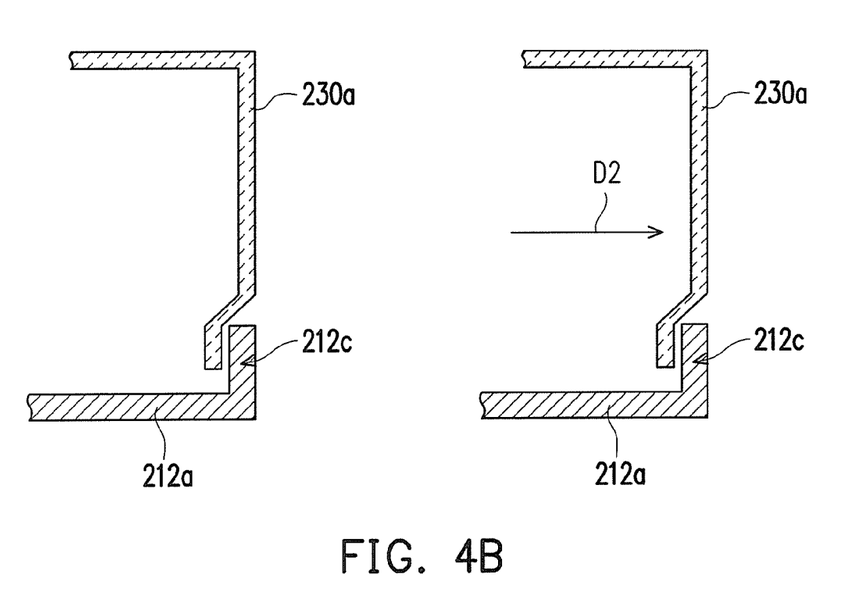

FIGS. 4A and 4B are the schematic cross-sectional views of the first fastener and the baffle when the frame shown in FIG. 3A is impacted respectively. Please continue to refer to FIG. 4A, in the left hand side of FIG. 4A, the first fastener 212b lodges in the second fastener 230b, and the first fastener 212b and the second fastener 230b pierce through the second body 230a and the first body 212a respectively. When the assembled first frame 212 and the second frame 230 are impacted, the relative displacement between the first frame 212 and the second frame 230 along the first direction D1 is constrained by the first fastener 212b and the second fastener 230b as shown in the right hand side of the FIG. 4A. Next, please refer to the left hand side of FIG. 4B, the baffle 212c of the second frame 230 fastens with the first body 212a of the first frame 212. Accordingly, when the assembled first frame 212 and the second frame 230 are impacted, the relative displacement between the first frame 212 and the second frame 230 along the second direction D2 is constrained by the baffle 212c of the first frame 212 as shown in the right hand side of the FIG. 4B. Compared with the conventional liquid crystal display device, the structure strength of the assembled first frame 212 and the second frame 230 can be enhanced under the condition when the liquid crystal display device is impacted.

Second Embodiment

Figure 5A:
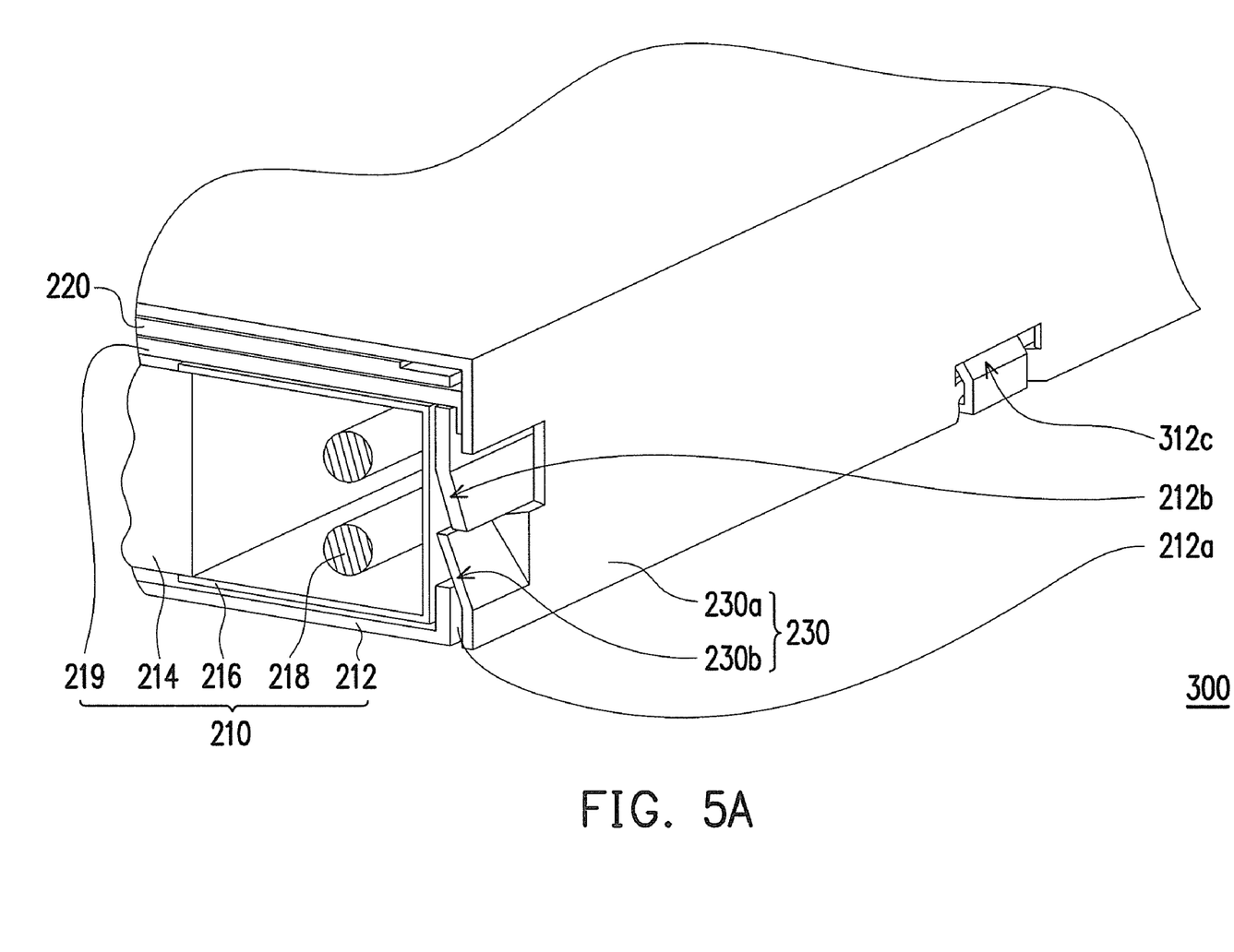
FIG. 5A is a three-dimensional, cross-sectional diagram of the assembled frames according to a second embodiment of the present invention.
Figure 5B:
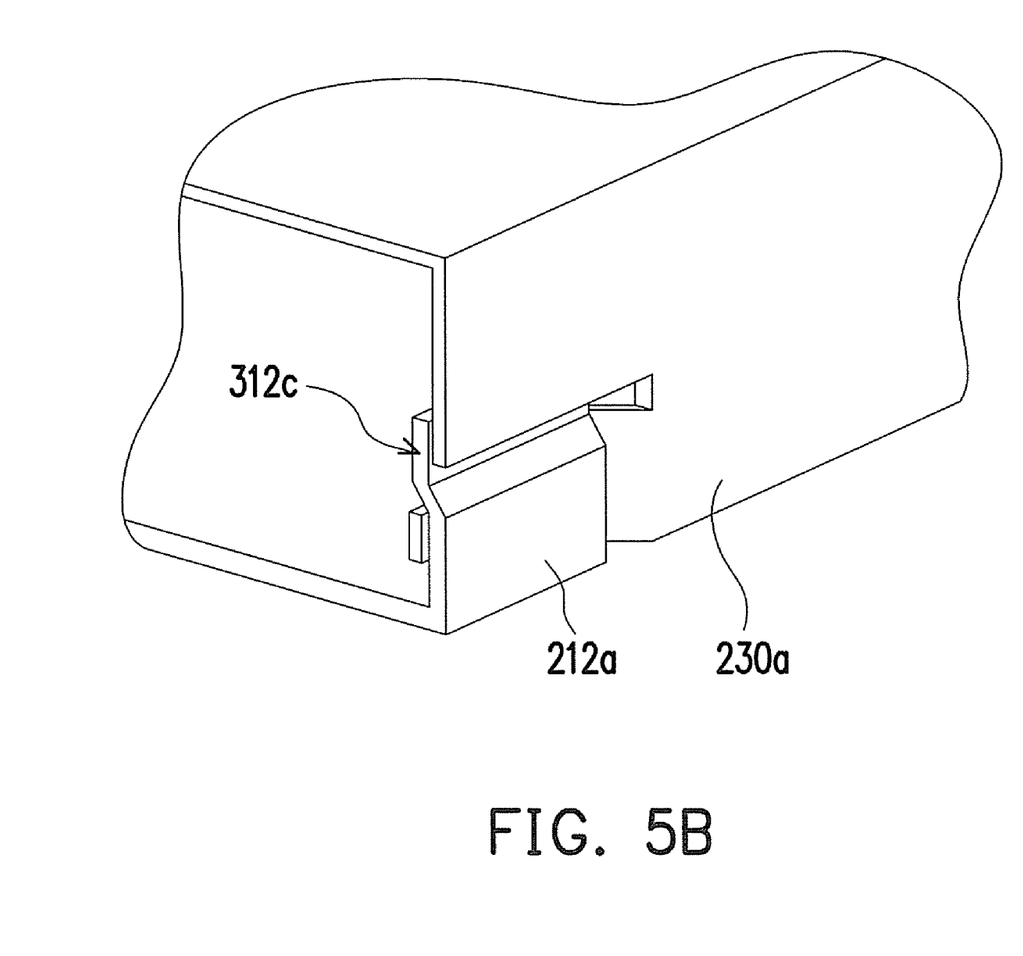
FIG. 5B is a three-dimensional diagram of the baffle shown in FIG. 5A.

FIG. 5A is a three-dimensional diagram of the assembled frames according to a second embodiment of the present invention, and FIG. 5B is a three-dimensional diagram of the baffle shown in FIG. 5A. Please refer to FIGS. 5A and 5B, the liquid crystal display device 300 of the second embodiment is similar to the liquid crystal display device 200 of the first embodiment, the difference between them is that the baffles 312c used in this embodiment pierce through the second body 230a, and the baffle 312c and the first body 212a are disposed at one side and the other side of the sidewall of the second body 230a respectively.

Figure 5C:
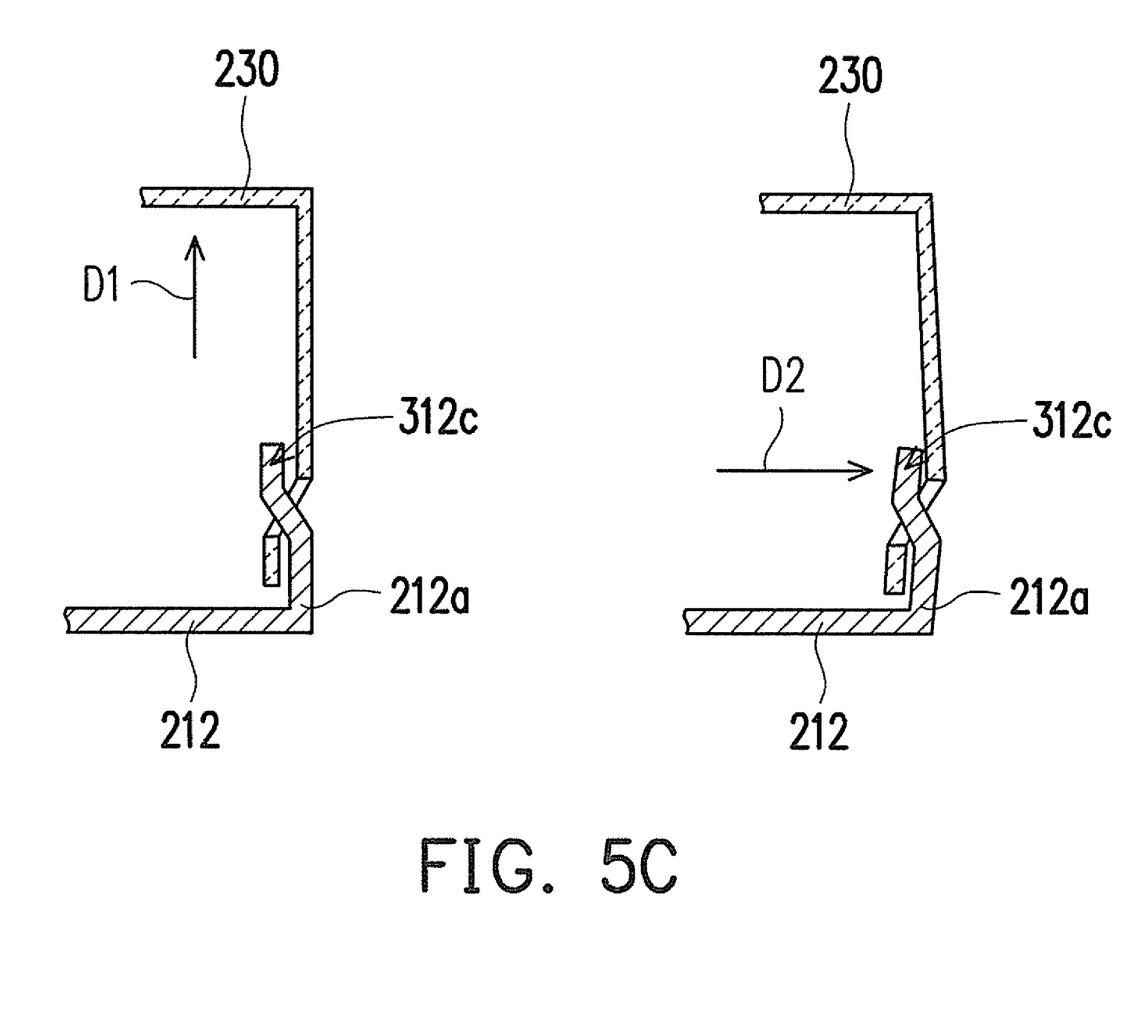
FIG. 5C is a schematic cross-sectional view showing the first fastener when against the impact according to the second embodiment.

FIG. 5C is a schematic cross-sectional view showing the first fastener when against the impact according to the second embodiment. Compared with the baffles 212c shown in FIG. 3A, the baffle 312c may further extend and pierce through the inner side of the first body 230a of the second frame 230. More specifically, the baffle 312c and the first body 212a are disposed at one side and the other side of the sidewall of the second body 230a, and the baffle 312c pierces through the second body 230a partially. This type of baffle 312c can not only resist the upward impact along the first direction D1 but also the second direction D2.

Third Embodiment

Figure 6A:
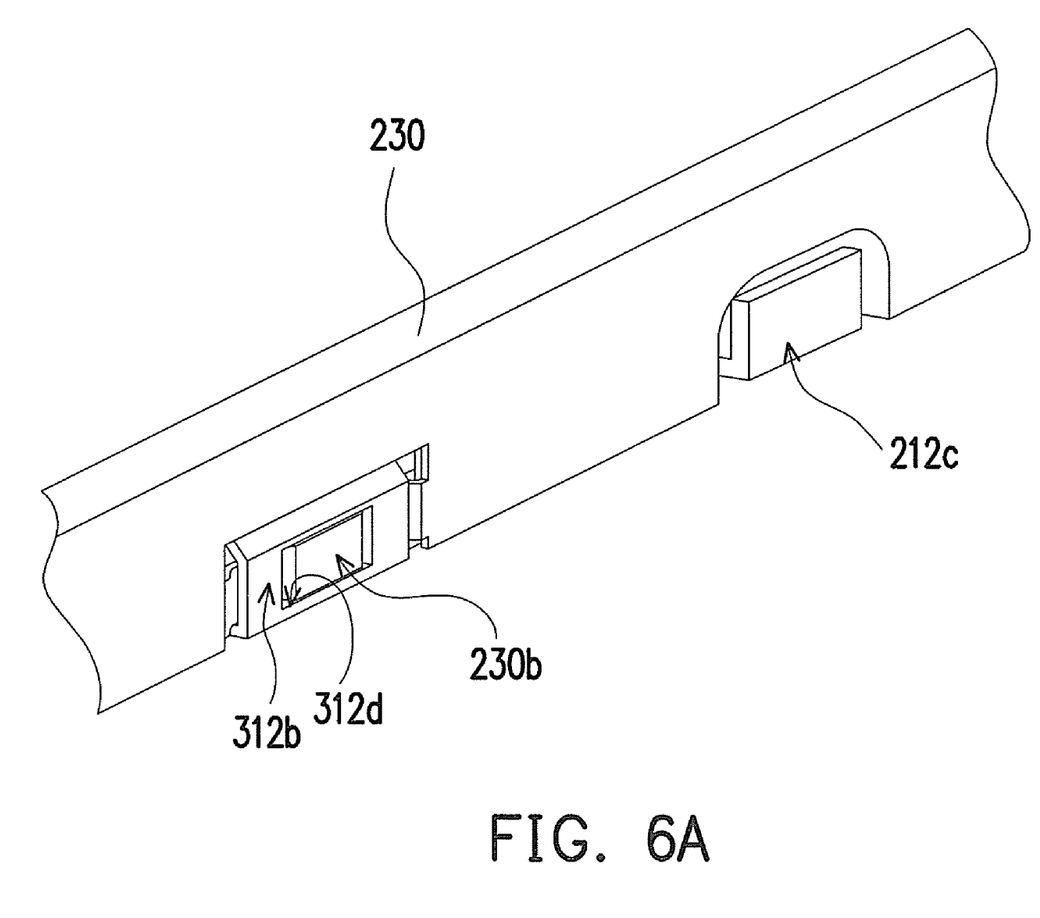
FIG. 6A is a partial three-dimensional diagram of the assembled frames according to a third embodiment of the present invention.
Figure 6B:
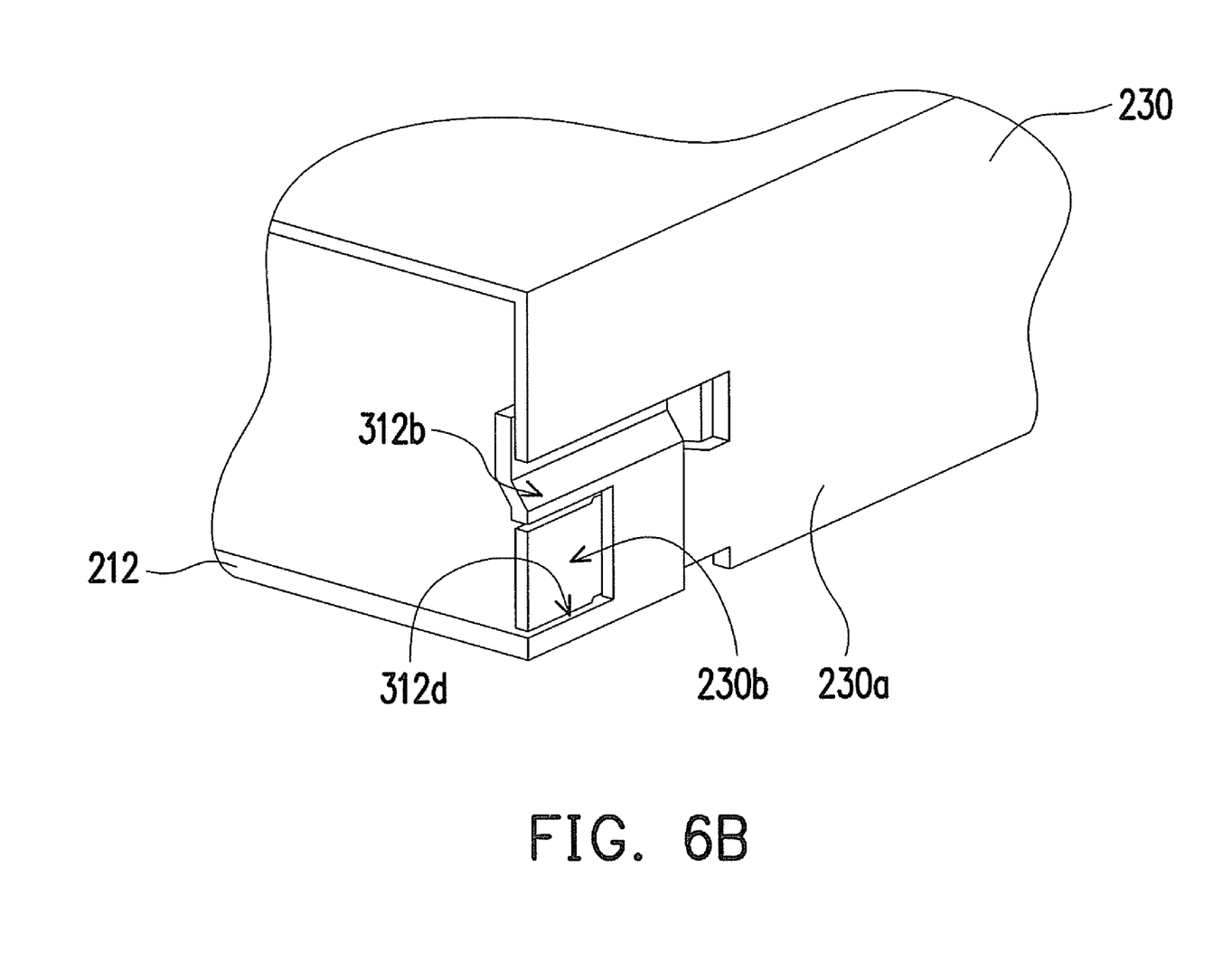
FIG. 6B is a three-dimensional diagram of the baffle shown in FIG. 6A.

FIG. 6A is a partial three-dimensional diagram of the assembled frames according to a third embodiment of the present invention. FIG. 6B is a three-dimensional diagram of the baffle shown in FIG. 6A. Please refer to FIGS. 6A and 6B, the liquid crystal display device of the third embodiment is similar to the liquid crystal display device 200 of the first embodiment, the difference between them is that: the first fastener 312b of the first frame 212 comprises an opening 312d (as shown in the left hand side of FIG. 6B), such that a portion of the corresponding second fastener 230b can lodge in the opening 312d. It should be noted that, in this embodiment, the first fastener 312b further extends and pierces through the inner side of the second body 230a (similar to the baffle 312c of the second embodiment).

Figure 6C:
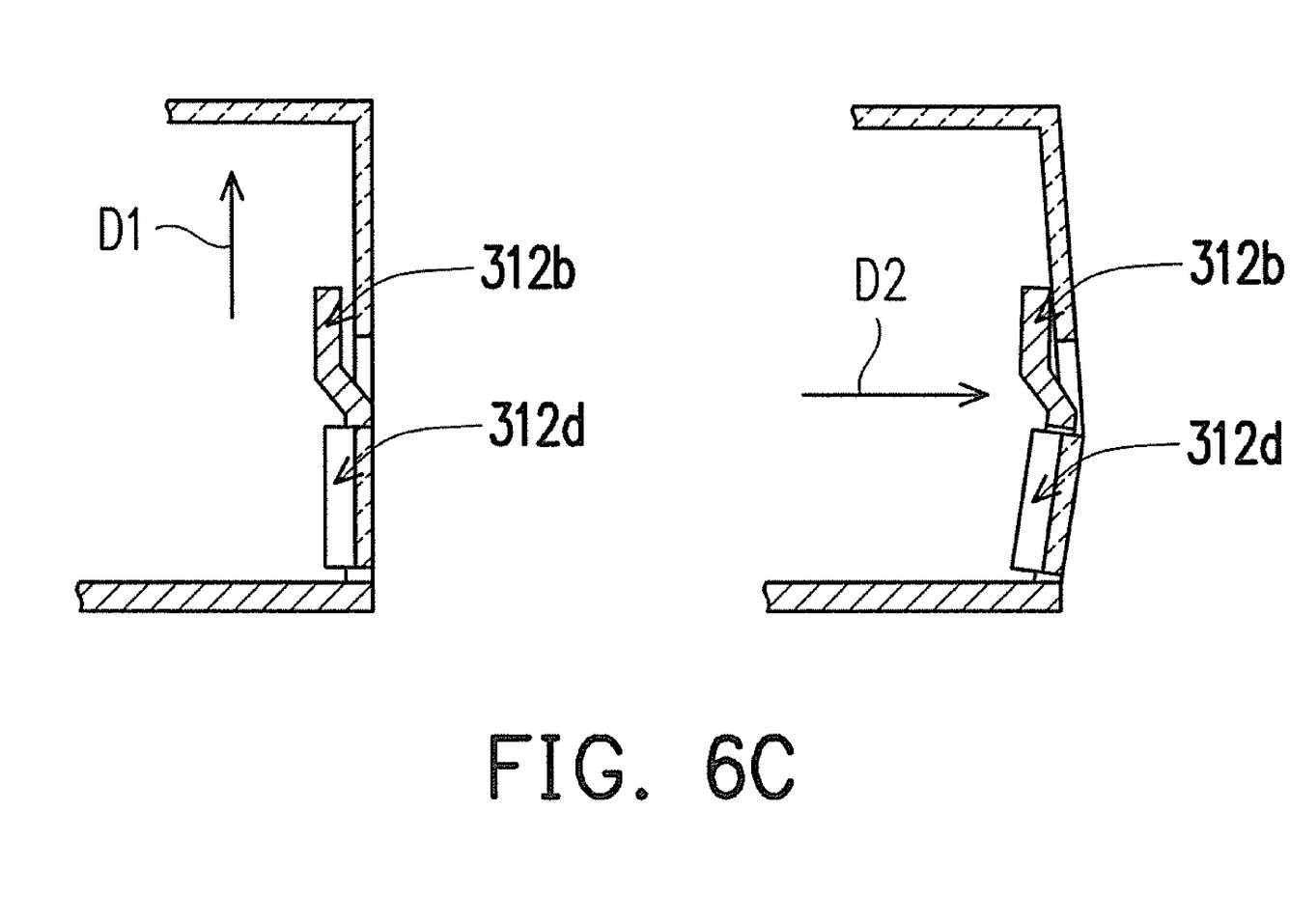
FIG. 6C is a schematic cross-sectional view showing the first fastener when against the impact according to the third embodiment.

FIG. 6C is a schematic cross-sectional view showing the first fastener when against the impact according to the third embodiment. Please refer to FIG. 6C, the first fastener 312b of this embodiment has an opening 312d, and a portion of the corresponding second fastener 230b can lodge in the opening 312d. It should be noted that the use of the first fastener 312b and the second fastener 230b may increase the structure strength of the assembled first frame 212 and second frame 230. More specifically, as shown in FIG. 8, the cooperation between the first fastener 312b and the second fastener 230b can not only resist the upward impact along the first direction D1 but also the second direction D2. Besides, the baffle (it means the baffle 312c) of the second embodiment may serve as the baffle 212c of this embodiment.

Note that the first fastener 212b and the second fastener 312b of the first embodiment, the baffle 312c of the second embodiment (or the baffle 212c of the first embodiment) and the first fastener 312b having the opening 312d of the third embodiment may apply to the first frame 212 or the second frame 230 independently. Otherwise, the combination of different types of the fasteners, baffles and openings may apply to the first frame 212 and the second frame 230 of one embodiment.

In summary, the invention utilizes two sets of fasteners to limit the relative displacement of the first and second frame under the impact. In other words, when the first and second frames are impacted, the first frame would not separate from the second frame easily. Besides, the baffles and the fasteners may have different design in order to increase the structure strength of the assembled first and second frames.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display device, comprising:
a backlight module comprising a first frame, the first frame comprising a first body, a plurality of first fasteners and a plurality of baffles, wherein the first fasteners and the baffles are integrally formed on a sidewall of the first body, and the first fasteners having a plurality of opening;
a liquid crystal display device panel arranged on the backlight module; and
a second frame assembled with the first frame for fixing the liquid crystal display device panel, the second frame comprising a second body and a plurality of second fasteners integrally formed on a sidewall of the second body, and the second fasteners lodging in the openings of the first fasteners to limit the relative displacement between the first and second body along a first direction, and the baffles are adapted for limiting the relative displacement between the first and second body along a second direction.

2. The liquid crystal display device according to claim 1, wherein the first direction is perpendicular to the second direction.

3. The liquid crystal display device according to claim 1, wherein the first fasteners and the second fasteners pierce through the second body and the first body respectively.

4. The liquid crystal display device according to claim 1, wherein the backlight module further comprises:
a light guiding plate arranged inside the first frame;
a reflector arranged beside the light guiding plate;
a light source arranged inside the reflector; and
a sealant arranged between the first frame and the liquid crystal display device panel.

5. The liquid crystal display device according to claim 4, wherein the light source comprises a cold cathode fluorescent lamp or a light emitting diode array.

* * * * *